United States Patent [19]

Gross

[11] 4,063,058
[45] Dec. 13, 1977

[54] APPARATUS FOR MAKING SEAM WELDED TUBING

[75] Inventor: Heinz Gross, Dortmund, Germany

[73] Assignee: Hoesch Werke Aktiengesellschaft, Dortmund, Germany

[21] Appl. No.: 704,640

[22] Filed: July 12, 1976

[30] Foreign Application Priority Data

July 23, 1975 Germany .............................. 2532901

[51] Int. Cl.² ............................................ B23K 11/08
[52] U.S. Cl. ........................................ 219/62; 19/59; 219/73 R; 228/17.7
[58] Field of Search ...................... 219/73 R, 60 R, 61, 219/62, 59; 228/17.5, 17.7

[56] References Cited

U.S. PATENT DOCUMENTS

| 1,793,282 | 2/1931 | Freeze | 219/62 |
| 2,923,807 | 2/1960 | Hormann | 219/59 |

Primary Examiner—E. A. Goldberg
Attorney, Agent, or Firm—Toren, McGeady and Stanger

[57] ABSTRACT

Apparatus for making seam welded tubing of the type comprising a first butt welding machine for joining together by submerged arc welding the adjacent ends of successive lengths of strip to form a continuous strip, a strip storing device for storing the continuous strip and a tube forming and welding machine is provided with a series of roll stands with the roll axes of successive stands offset from each other so that as the strip passes through the stands, it is turned over laterally. A second butt welding machine is then provided after the roll stands and before the strip is fed into the tube forming and welding machine so that the successive lengths of strip are first butt welded together along the joint on one face of the strip and then second welds are made on the other face of the strip so that no further welding is necessary after the tube has been formed and seam welded in the tube forming and welding machine.

9 Claims, 2 Drawing Figures

APPARATUS FOR MAKING SEAM WELDED TUBING

This invention relates to apparatus for making seam welded tubing. The apparatus comprises a first butt welding machine for joining together by submerged arc welding the adjacent ends of successive lengths of strip to form a continuous strip, a strip storing device for storing the continuous strip, a tube forming and welding machine for forming the continuous strip into a tube and welding it and means for feeding the strip through the butt welding machine, the storing device and then to the forming and welding machine.

The making of seam welded tubes by longitudinal or helical seam welding can only be carried out economically if the ends of the lengths of strip which is normally delivered in the form of individual strips, can be welded together to form a continuous strip. This is usually done, in view of the high weld quality required, by submerged arc butt welding. Since the powder must cover the weld zone, overhead welding is not possible and consequently with the strip in a laterally horizontal attitude only the upper sides of the ends of the strips can be welded together. This is indeed sufficient for forming the strip into a tube blank and for the subsequent longitudinal or helical seam welding, but it does necessitate subsequent welding of the strip butt joint on the opposite side, that is, on what was previously the underside of the strip. This may be done, for example, after the seam welding, by means of a special external transverse seam welding machine. Since the transverse seam extends along a curve, that is, perpendicularly to the edges of the strip and the helical or longitudinal seam, a relatively expensive transverse seam welding machine is necessary for this purpose. Moreover, after the welding has been carried out, the unavoidable hump must still be removed from the seam, which is no less expensive.

The aim of this invention is to provide apparatus for making seam welded tubing, the apparatus comprising a first butt welding machine for joining together by submerged arc welding the adjacent ends of successive lengths of strip to form a continuous strip, a strip storing device for storing the continuous strip, a tube forming and welding machine for forming the continuous strip into a tube and welding it and means for feeding the strip through the butt welding machine, the storing device and then to the forming and welding machine, which enables submerged arc welding to be carried out on both sides of the ends of the strips and, if required, also enables the humps of the welds to be removed from above, before the tube is formed.

To this end, according to this invention, in such apparatus, strip turning means is provided between the first butt welding machine and a second butt welding machine to turn the strip over laterally and enable the second butt welding machine to make butt welds at the joints between adjacent lengths of strip on the opposite sides of the lengths of strip from those made by the first butt welding machine.

The apparatus has the further advantage that the welding is always carried out on the joint while the joint is straight, and the humps of the weld seams can be removed from both sides of the strip before the tube is formed. In addition, the butt weld seams can be heat treated if desired.

Preferably, the strip turning means comprises a series of stands, each having a pair of rolls, the axes of the pairs of rolls of successive stands being canted relative to each other about the longitudinal axis of the strip step by step so that, as the strip passes through the stands, it is twisted from a first laterally horizontal position through 180° to a second laterally horizontal position. In this way, the strip is subjected from one pair of rolls to the next to a preferably uniform twist about its longitudinal axis, until the total twist amount to 180 degrees and the previously lower face is uppermost. It is of especial advantage if the series of stands are in two groups, the first group twisting the strip through 90° into a vertical attitude in which it is on edge and the second group twisting the strip through a further 90° and the strip storing device is arranged to store the strip on edge and is situated between the two groups of stands.

This arrangement results in a minimum number of parts for the strip turning means, and only a relatively small space is required for the apparatus as a whole.

The rolls of the stands immediately ahead of the strip storing device and immediately ahead of the second butt welding machine may be driven and form feed rolls constituting part at least of the feeding means.

The strip storing device may have lower support rolls and devices disposed at intervals from one another for limiting the diameter of a spiral in which the strip is stored in the device. For example, the diameter limiting devices comprise an inner cylinder and outer rolls disposed in a circle around the inner cylinder. The strip storing device may also have an internal strip guide for introducing the continuous strip into the inner face of the spiral or onto the inner cylinder and an outer strip guide to remove the strip at the periphery from the largest turn of the spiral.

An example of an apparatus in accordance with the invention is illustrated in the accompanying drawings, in which:-

Figure 1:
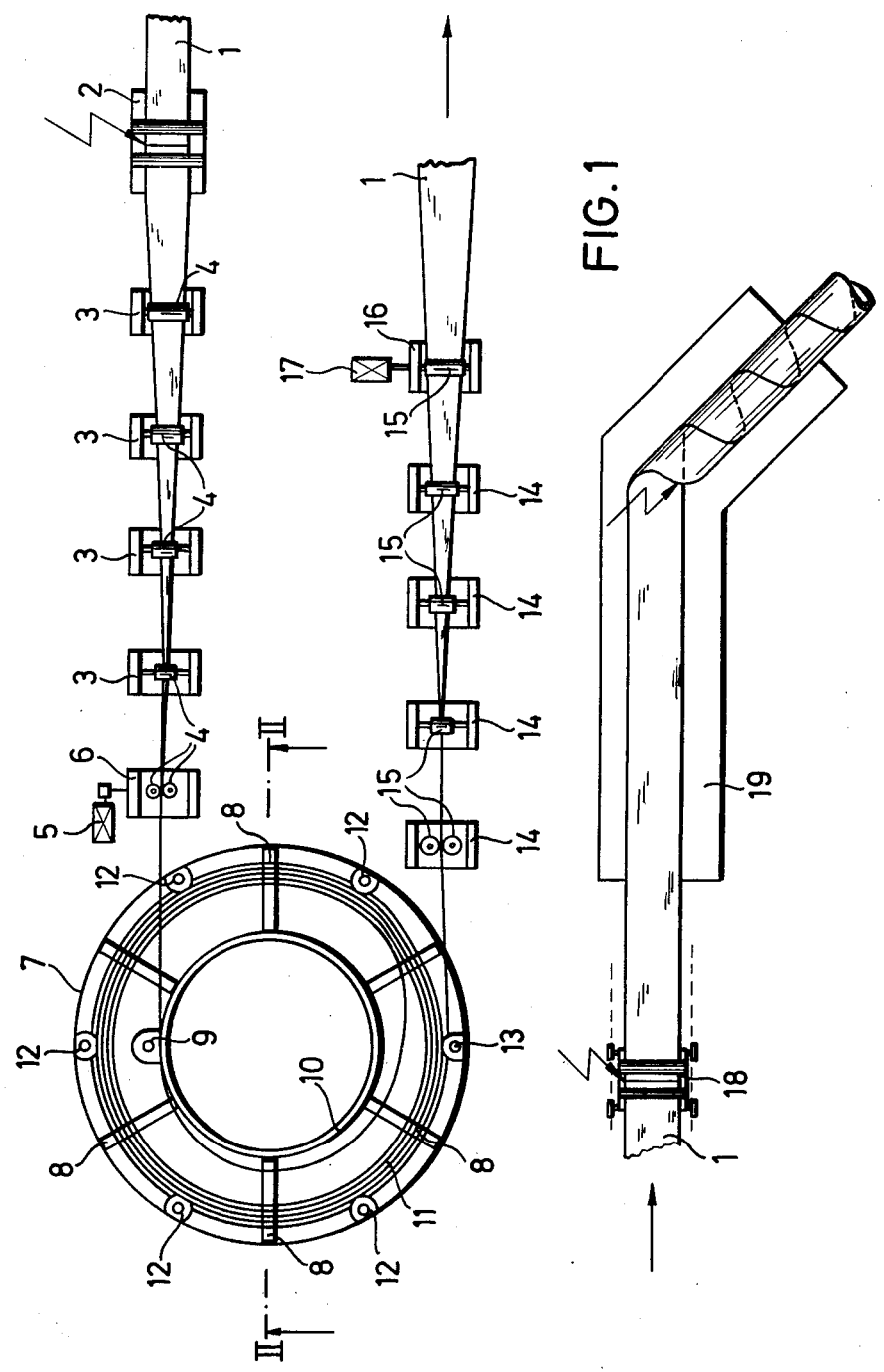
FIG. 1 is a diagrammatic plan view.
Figure 2:
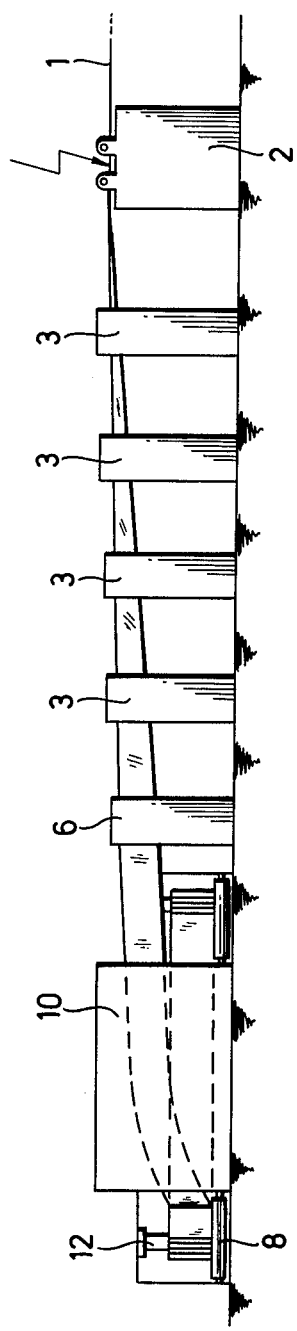
FIG. 2 is a vertical section through the apparatus along the line II—II of FIG. 1.

Strip 1, fed horizontally from a reel not shown, first arrives at a conventional butt welding machine 2, by which the forward end of the strip and the rear end of a preceding strip are joined together by submerged arc welding to form a continuous strip. The continuous strip made in this way is then immediately fed through a sequence of stands 3 each having a pair of rolls 4, which are each canted through a specific angle about the longitudinal axis of the strip from one stand to the next, until finally the pair rolls in the last stand 6, which are feed rolls and are driven by a motor 5, is vertical. Consequently the strip is turned and enters a strip store 7 on edge in a vertical attitude. In the store 7, the strip rests upon support rolls 8 and is supplied to the strip store over a vertical guide roll 9 in the vicinity of an inner cylinder 10 which limits the internal diameter of a spiral 11 of strip formed in the strip store 7. The external diameter of the strip spiral 11 is limited by external rolls 12, disposed in a circle around the inner cylinder 10.

If the strip is introduced into the strip store at the same speed as that at which it leaves it, the dynamic state of the strip spiral remains constant. The turn of the spiral of smallest diameter revolves slightly more rapidly than the turn of the spiral of largest diameter, so that their circumferential speeds are the same. If the feed of the strip into the store 7 is interrrupted while two strip ends are welded together in the welding machine 2, the spiral continues to revolve so that strip can continue to be drawn from the outside of the spiral, in order to feed a tube forming and welding machine 19 in which the seam welded tube is formed. While this happens, without any change in the number of turns of strip in the strip store, the individual turns of the spiral, starting with the turn of smallest diameter, decrease in diameter in succession and this may continue until they reach their smallest possible diameters which is determined by the external diameter of the internal cylinder 10. When or before all the turns of the spiral have contracted to their smallest diameter, the welding together of the strip ends in the welding machine 2 must have been completed, in order that a continuous strip can be supplied again to the strip store.

The strip is finally drawn from the strip store over a vertical outlet roll 13 and is supplied on edge, that is in a vertical attitude, into the first of a group of stands 14 each having a pair of rolls 15. The axes of the pairs of rolls are so stepped in their angles from one stand to the next from the vertical through a given angle about the longitudinal axis of the strip, that the strip finally enters in a laterally horizontal position into a stand 16 comprising horizontal feed rolls 15 driven by a motor 17. The face of the strip which was previously lowermost is now uppermost, so that before the strip enters a tube forming and welding machine 19, in which a helically welded tube is produced in a conventional manner, the butt joints of the continuous strip can be welded by the submerged arc process on what was previously the lower side of the strip by means of a second butt welding machine 18, which is preferably mounted so that it can move forwards with the strip while the weld is being made and then moves backwards again ready to start the next weld. This is known as a flying mounting.

I claim:

1. In apparatus for manufacturing seam welded tubing from strip, said apparatus being of the type having a first submerged arc butt welding machine for joining together the ends of successive lengths of said strip to form a continuous strip, a strip storing device for storing said continuous strip, a tube forming and welding machine for forming said continuous strip into a tube and welding said tube, and means for feeding said strip through said first butt welding machine, said storing device and then to said forming and welding machine, the improvement comprising a second butt welding machine, and strip turning means between said first butt welding machine and said second butt welding machine, said strip turning means being operative to turn said strip over laterally whereby said second butt welding machine can make butt welds between said ends of said successive lengths of strip on the opposite faces of said lenghts of strip from the welds made by said first butt welding machine.

2. Apparatus as claimed in claim 1, further includes flying mounting means mounting said second butt welding machine whereby said second butt welding machine can move forwards with said strip while said second welding machine is welding together said ends of said successive lengths of strip and said second butt welding machine then moves back again ready to start a succeeding weld.

3. Apparatus as claimed in claim 1, wherein said strip turning means includes a series of roll stands, a pair of mating rolls in each of said stands, means mounting each of said rolls for rotation about an axis, the axes of said pairs of rolls of successive stands in said series being canted relative to each other about the length of said strip, step by step whereby, as said strip is fed by said feeding means through said stands, said strip is twisted from a first laterally horizontal position through 180 degrees to a second laterally horizontal position.

4. Apparatus as claimed in claim 1, wherein said strip turning means includes a first group of roll stands, a second group of roll stands, a pair of mating rolls in each of said roll stands, means mounting each of said rolls for rotation about an axis, the axes of the pairs of rolls of successive stands in each of said groups being canted relative to each other about the length of said strip step by step so that, as said strip is fed by said feeding means through said stands of said first group, said strip is twisted from a first laterally horizontal position through 90° to a vertical position and as said strip if fed by said feeding means through said stands of said second group, said strip is twisted from said vertical position through a further 90° to a second laterally horizontal position angularly offset 180 degrees from said first laterally horizontal position.

5. Apparatus as claimed in claim 4, wherein said strip storing means includes means for holding said strip on edge in a vertical position and said strip storing device is situated between said first group of stands and said second group of stands.

6. Apparatus as claimed in claim 1, wherein said strip storing device includes means for coiling said strip into a spiral having an internal diameter and an external diameter, lower support rolls for supporting said strip in said spiral on edge, and devices disposed at intervals from one another for limiting said internal diameter and said external diameter of said spiral.

7. Apparatus as claimed in claim 6, wherein said means for limiting said internal diameter of said spiral includes inner cylinder means and said means for limiting said outer diameter of said spiral comprises a plurality of outer rolls and means rotatably mounting said rolls with the axes thereof upright and disposed in a circle around said inner cylinder means.

8. Apparatus as claimed in claim 5, wherein said strip storing device includes internally situated strip guide means and externally situated strip guide means.

9. Apparatus as claimed in claim 5, wherein one stand of said first group is situated immediately ahead of said strip storing device and one of said stands of said second group is situated immediately ahead of said second butt welding machine and said apparatus further comprises means for driving said rolls of said one of said stands of said first group and means for driving said rolls of said one of said stands of said second group, whereby said driven rolls are operative as feed rolls and constitute at least part of said feeding means.

* * * * *